(12) United States Patent
Auer et al.

(10) Patent No.: US 7,811,385 B2
(45) Date of Patent: Oct. 12, 2010

(54) METHOD AND APPARATUS FOR CONTROLLING A VEHICLE WASHING INSTALLATION

(75) Inventors: Robert Auer, Stadtbergen (DE); Stefan Mayer, Neusäss (DE)

(73) Assignee: Washtec Holding GmbH, Augsburg (DE)

( * ) Notice: Subject to any disclaimer, the term of this patent is extended or adjusted under 35 U.S.C. 154(b) by 240 days.

(21) Appl. No.: 12/066,925

(22) PCT Filed: Dec. 23, 2006

(86) PCT No.: PCT/EP2006/012528

§ 371 (c)(1),
(2), (4) Date: Apr. 10, 2008

(87) PCT Pub. No.: WO2007/087889

PCT Pub. Date: Aug. 9, 2007

(65) Prior Publication Data
US 2008/0250585 A1     Oct. 16, 2008

(30) Foreign Application Priority Data
Jan. 20, 2006   (DE) ................. 10 2006 002 794

(51) Int. Cl.
*B08B 3/04* (2006.01)
*G01B 11/24* (2006.01)

(52) U.S. Cl. ............... 134/18; 134/56 R; 134/123; 356/601; 356/607; 356/608

(58) Field of Classification Search .............. 134/18, 134/56 R, 123; 356/2, 601, 607, 608
See application file for complete search history.

(56) References Cited
U.S. PATENT DOCUMENTS
5,175,601 A   12/1992   Fitts 6,709,530 B1   3/2004   Dietsch

FOREIGN PATENT DOCUMENTS
CA          2 553 317        7/2005

(Continued)

OTHER PUBLICATIONS
International Search Report published Aug. 9, 2007 for PCT/EP2006/012528.

(Continued)

*Primary Examiner*—Barbara L Gilliam
*Assistant Examiner*—Natasha Campbell
(74) *Attorney, Agent, or Firm*—Martin Fleit; Paul D. Bianco; Fleit Gibbons Gutman Bongini & Bianco PL

(57) ABSTRACT

The invention relates to a method for controlling a vehicle washing installation with the use of a light-section procedure, wherein at least one treatment device (1) and a vehicle (2) to be washed are moved relative to each other in the washing direction (L), the vehicle surfaces are illuminated by two light fans (11, 12) starting from different positions, a first (FIG. 7) and a second (FIG. 8) two-dimensional depiction of the vehicle surfaces illuminated by the light fans (11, 12) are recorded from shooting angles which are oblique with respect to the planes of the light fans, and are stored in a control unit (20) together with the relative position and/or relative movement of treatment devices (1) and vehicle (2), the preceding steps are repeated during a traversing operation from one end to the other end of the vehicle (2), and, during or after the end of the traversing operation, a three-dimensional representation of the vehicle surfaces is calculated from the two-dimensional depictions (FIG. 7, FIG. 8) stored in the control unit (20), and from the shooting angles, the relative position and/or relative movement and position data of the light fans (11, 12), and said three-dimensional representation is used in order to control the vehicle washing installation, in particular the treatment devices (1) arranged thereon.

16 Claims, 4 Drawing Sheets

FOREIGN PATENT DOCUMENTS

| | | |
|---|---|---|
| DE | 3208527 | 11/1982 |
| DE | 3544390 | 4/1987 |
| DE | 3825346 | 2/1990 |
| DE | 4208455 | 9/1993 |
| DE | 4417864 | 11/1995 |
| DE | 4439583 | 5/1996 |
| DE | 29613229 U1 * | 11/1997 |
| DE | 29613229 | 1/1998 |
| DE | 198 01 615 | 7/1999 |
| DE | 20204586 | 9/2003 |
| DE | 69811667 | 12/2003 |
| DE | 103 12 696 | 12/2004 |
| EP | 0283446 | 9/1988 |
| JP | 2002/211366 | 7/2002 |

OTHER PUBLICATIONS

English Translation of International Preliminary Report on Patentability published Sep. 9, 2008 for PCT/EP2006/012528.

English Translation of Written Opinion published Sep. 3, 2008 for PCT/EP2006/012528.

* cited by examiner

METHOD AND APPARATUS FOR CONTROLLING A VEHICLE WASHING INSTALLATION

FIELD OF THE INVENTION

The invention pertains to a method for controlling a vehicle washing installation. The invention furthermore pertains to an apparatus for controlling a vehicle washing installation.

BACKGROUND OF THE INVENTION

In vehicle washing installations, it is desirable to determine the surface structure of the vehicle to be washed as accurately as possible in order to guide treatment devices such as the rotating brushes of the displaceable washing portal as close as possible to the vehicle surfaces without damaging the vehicle or accessory parts mounted thereon.

In conventional vehicle washing installations, this is usually achieved with light barriers that are arranged on the vehicle washing installation laterally or above the vehicle and determine the vertical contour of the vehicle. For example, DE 32 08 527, DE 35 44 390 or DE 202 04 586 disclose scanning devices that are situated in front of the first work station of the washing installation and consist of several light barriers that are arranged vertically on top of one another or in a matrix-like fashion in order to determine the vertical contour of the vehicle. In the portal washing installation according to DE 38 25 346, a unit for determining the vertical contour is provided which consists of light barriers arranged vertically on top of one another, wherein said unit is arranged directly on the displaceable portal. In addition, a light barrier arrangement is positioned on the vertically displaceable drying nozzle in order to determine and control the distance of the drying nozzle from the vehicle roof.

DE 44 17 864 also discloses a light barrier arrangement that, however, does not determine the vertical contour of the vehicle. In this case, two light barriers are vertically arranged on the sides of the vehicle in order to determine the lateral contour of the vehicle and control the lateral treatment modules accordingly.

The disadvantage of carrying out contour measurements and controlling vehicle washing installations with these known apparatuses is that the vertical contour can only be determined at the respectively highest point and the lateral contour can only be determined at the points of the vehicle that protrude farthest, such that the actual three-dimensional surface structure of the vehicle to be washed cannot be determined.

Another vertical contour measurement is described in DE 44 39 583. In this case, an ultrasonic transmitter/receiver emits an ultrasonic beam toward the vehicle surface in the longitudinal direction during the relative movement between the vehicle and the washing portal, wherein said ultrasonic beam is directly reflected back to the ultrasonic transmitter/receiver at a few locations. The transit time of these more or less randomly reflected beams is determined, and an image of the vertical contour of the vehicle surface is prepared therefrom. The disadvantage of this method is that the vehicle contour can only be determined at a few locations in this case, and it is not possible to easily determine whether the respectively highest locations of the vehicle are contained in this vertical contour.

SUMMARY OF THE INVENTION

The present invention is based on the objective of making available an apparatus and a method for controlling a vehicle washing installation of the initially cited type which eliminate the above-described disadvantages and make it possible to determine the three-dimensional surface structure of a vehicle in a vehicle washing installation reliably and with insensitivity to unfavorable external conditions, wherein said apparatus and method also make it possible to achieve an improved control of the vehicle washing installation.

This objective is attained with a method for controlling a vehicle washing installation and an apparatus for carrying out this method as described herein. Advantageous embodiments and practical additional refinements of the invention are also described herein.

One particular advantage of the inventive method and the inventive apparatus can be seen in that the three-dimensional surface structure of a vehicle to be washed is determined in its entirety such that the treatment devices of the vehicle washing installation can be optimally adapted to the vehicle. The utilization of two laser line projector-camera pairs furthermore makes it possible to avoid "white" or unknown regions resulting from undercuts in the surface structure of the vehicle. Conventional calculation methods such as the triangulation-based light section method or laser light section method are preferably used for calculating the three-dimensional surface structures.

In one particularly advantageous embodiment of the invention, the light sources consist of laser line projectors that generate static light fans or laser fans. The image recording units advantageously consist of light-sensitive cameras that record images electronically, particularly CCD cameras. Very good images of the projections of the light fans on the vehicle surfaces are achieved if filters that are adapted to the wavelengths of the emitted light beams, particularly to the wavelengths of the laser beams, are arranged in front of the cameras.

In order to protect the image recording units from the unfavorable moist ambient conditions in a vehicle washing installation, one embodiment proposes to arrange the light source and/or the image recording units in a protective housing.

BRIEF DESCRIPTION OF THE DRAWINGS

Other features and advantages of the invention are disclosed in the following description of preferred embodiments which refers to the figures. Shown are.

DETAILED DESCRIPTION OF THE INVENTION

Figure 1:
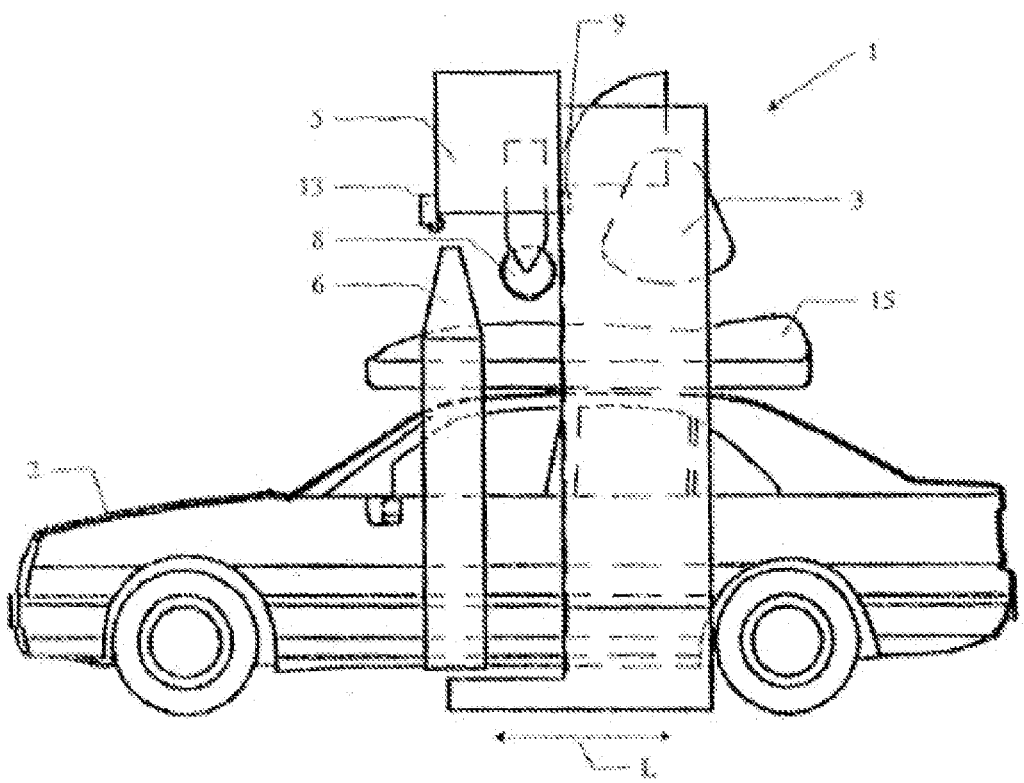
FIG. 1, a schematic side view of a displaceable portal of a portal washing installation with a vehicle to be washed.
Figure 2:
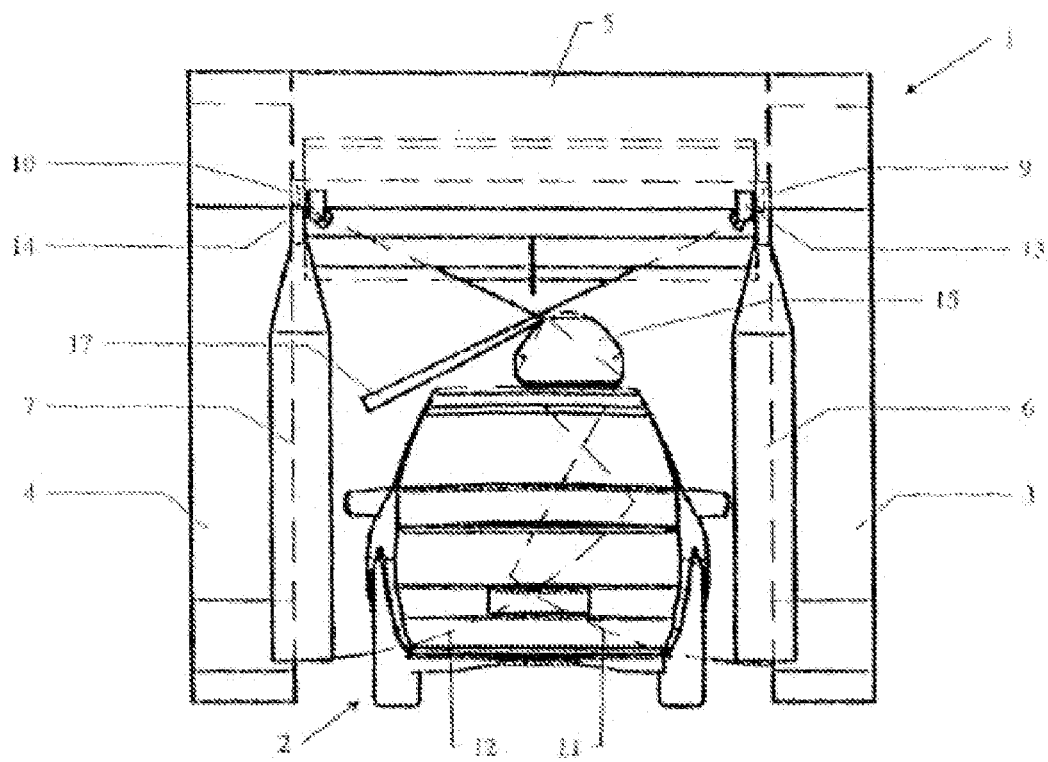
FIG. 2, a schematic front view of the portal shown in FIG. 1.

FIGS. 1 and 2 show a schematic representation of a generally known portal washing installation with a treatment device that is realized in the form of a washing portal 1 and a vehicle 2 to be washed. The washing portal 1 features two vertical portal columns 3 and 4 that can be displaced in the washing direction or longitudinal direction L of the vehicle 2, as well as a crossbeam 5 that extends transverse to the longitudinal direction L and connects the portal columns 3 and 4. Washing brushes 6 and 7 are arranged on the crossbeam 5 such that they are rotatable about vertical axes, wherein said washing brushes can be displaced on the crossbeam 5 transverse to the longitudinal direction L in order to wash the lateral surfaces and the front and rear sides of the vehicle 2. A washing brush 8 that horizontally extends over the vehicle roof is merely indicated in the figures. However, the invention can also be utilized in vehicle washing installations with high-pressure cleaning devices.

Figure 5:
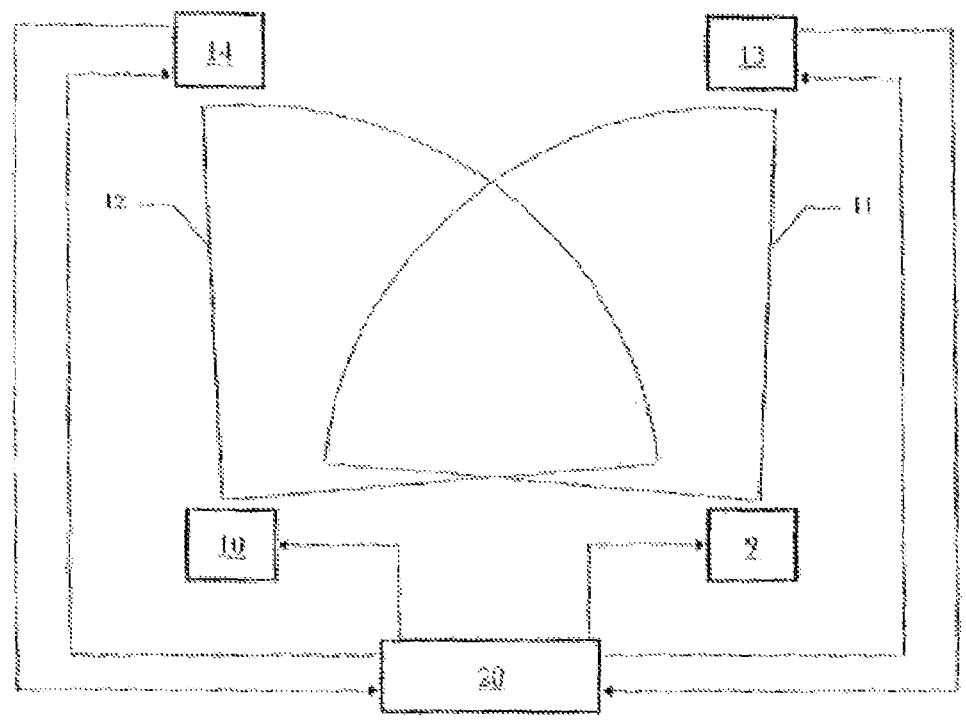
FIG. 5, a functional block diagram of the control of the washing installation.

In order to determine the three-dimensional surface structure or the progression of the surfaces of the vehicle 2, two light sources in the form of laser line projectors 9 and 10 are arranged on the right lower edge of the crossbeam 5 in FIG. 1 and on the inner sides of the portal columns 3 and 4. The laser line projectors 9 and 10 respectively contain a laser and an adapted lens system that widens the laser beams into static light fans 11 and 12. Instead of utilizing a lens system, the light fans 11 and 12 can also be realized by utilizing lasers with punctiform laser beams that rapidly rotate in the light fan plane or rapidly move back and forward such that non-static light fans are created. The light fans 11 and 12 that are schematically illustrated in the figures extend in a plane that lies perpendicular to the longitudinal direction L of the vehicle 2 and illuminate the upwardly directed and the lateral vehicle surfaces. The laser line projectors 9 and 10 are controlled by a control unit 20 of the vehicle washing installation which is illustrated in FIG. 5.

In order to record the light lines projected on the vehicle surfaces by the light fans 11 and 12, two image recording units in the form of CCD cameras 13 and 14 are arranged on the left lower edge at the lateral ends of the crossbeam 5 in FIG. 1. The cameras are arranged so far outward on the crossbeam 5 that they are able to respectively record one of the lateral vehicle surfaces and the essentially vertical and upwardly directed vehicle surfaces such as the front of the vehicle, the front and rear windshields, the roof, etc. In addition, the cameras 13 and 14 feature filters adapted to the wavelengths of the lasers such that interfering external light, for example, daylight or scattered light from artificial lighting systems, can be largely suppressed. The cameras 13 and 14 are also controlled and read by the control unit 20.

Both laser line projector-camera pairs 9, 13 and 10, 14 are required in order to reliably record the surface structure of the vehicle 2, particularly the structure of the lateral surfaces. Projecting vehicle parts such as taxi signs, exterior rearview mirrors, roof carriers or roof boxes 15 can create regions that are referred to as undercuts that cannot be recorded by a camera, such that no images and, therefore, no information on these surface structures is available. The utilization of two laser line projector-camera pairs 9, 13 and 10, 14 ensures that all important surface structures can be illuminated by at least one light fan 11 or 12 and recorded with at least one camera 13 or 14.

Figure 3:
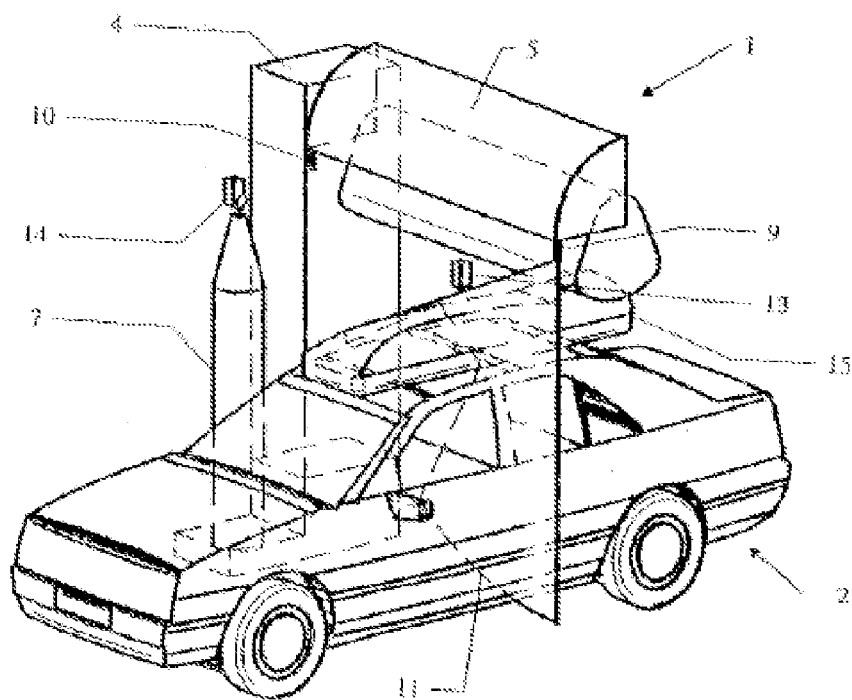
FIG. 3, a schematic perspective representation of the portal shown in FIG. 1.
Figure 4:
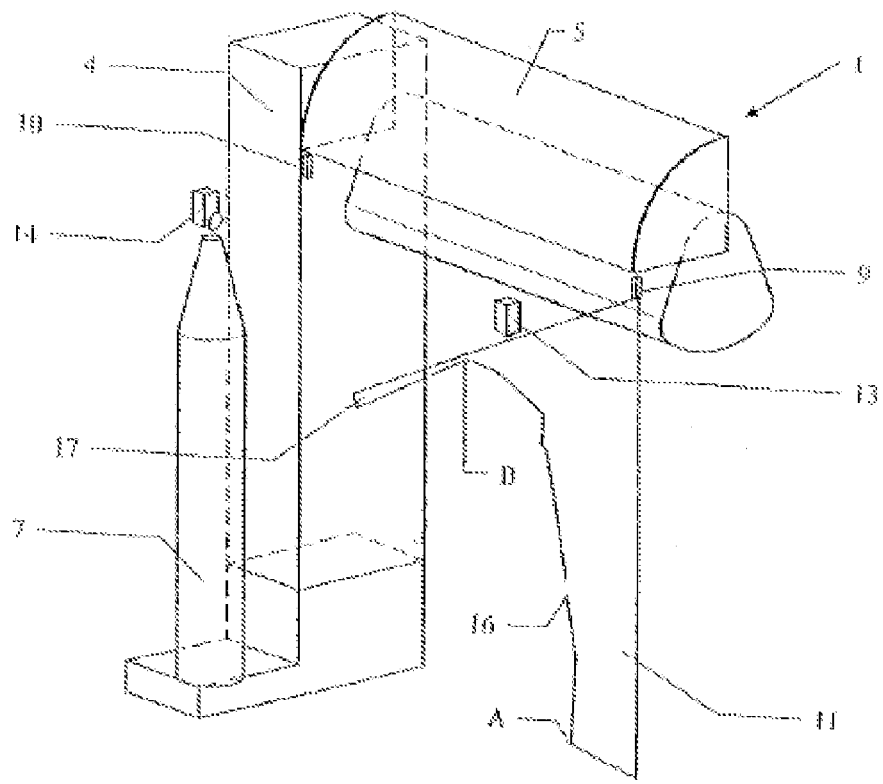
FIG. 4, a schematic perspective representation of the portal shown in FIG. 1 without a vehicle to be washed.

One example of a light line projected on the vehicle surface by the light fan 11 is illustrated in FIG. 4. A comparison between FIGS. 2 and 3 clearly shows that the light fan 11 produces a light line 16 on the vehicle surface that is not shown in FIG. 4, wherein said light line can be recorded between the points A and B by the camera 13. However, the camera 14 only "sees" the short horizontal segment of the light line 16 that lies to the right of B while the remainder of the light line 16 extending toward A is concealed for the camera 14 by the right side of the vehicle in the figures. The region adjacent to the roof box 1 [sic; 15] and to the left of B is concealed for the camera 13 such that the surface structure can only be recorded with the camera 14 at this location. In this case, only the left light fan 12 produces a light line on the vehicle surface because the light beam 17 of the right light fan 11 is not incident on the vehicle surface such that it does not produce a light section at this location.

Figure 6:
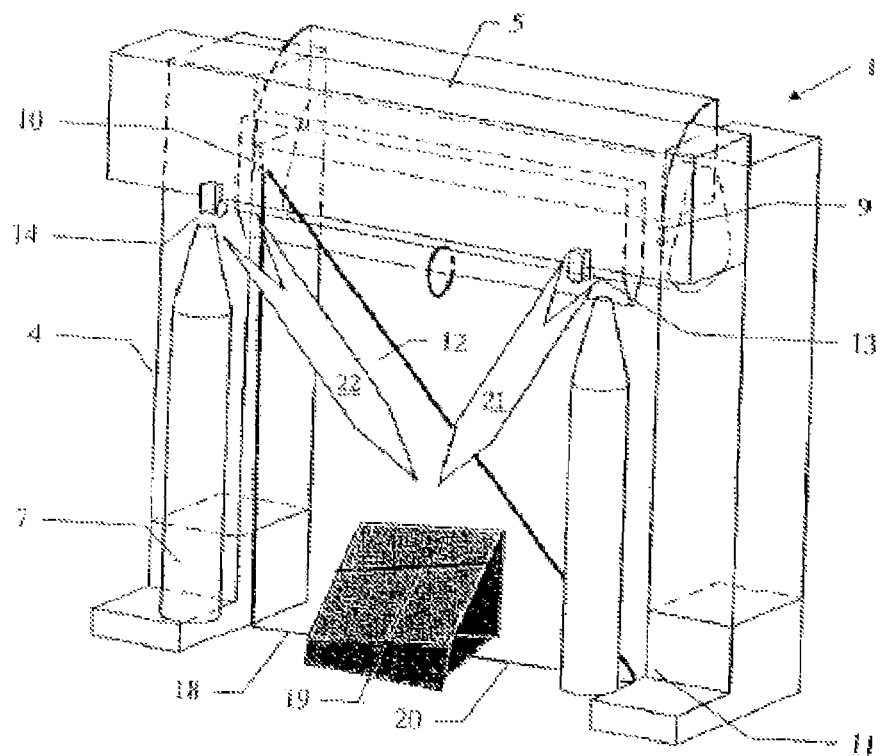
FIG. 6, a schematic perspective representation of the portal shown in FIG. 1 in order to elucidate the function of determining the three-dimensional surface structure of an exemplary object.
Figure 7:
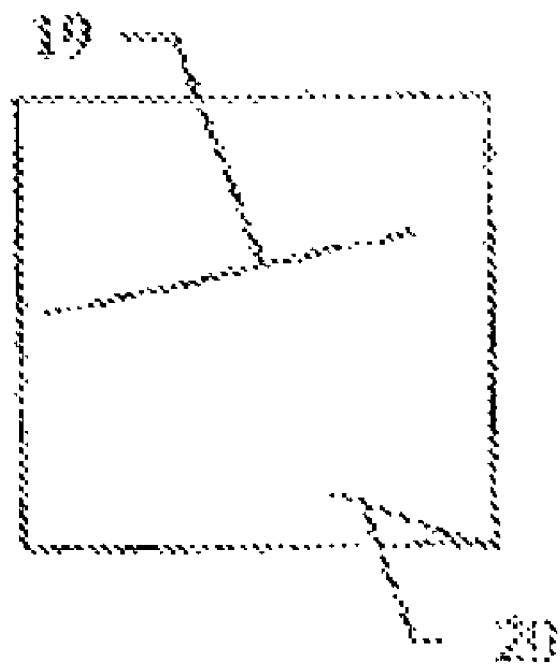
FIG. 7, a first two-dimensional image of the three-dimensional surface structure of the exemplary object shown in FIG. 6 which was recorded by a first camera, and FIG. 8, a second two-dimensional image of the three-dimensional surface structure of the exemplary object shown in FIG. 6 which was recorded by a second camera.
Figure 8:
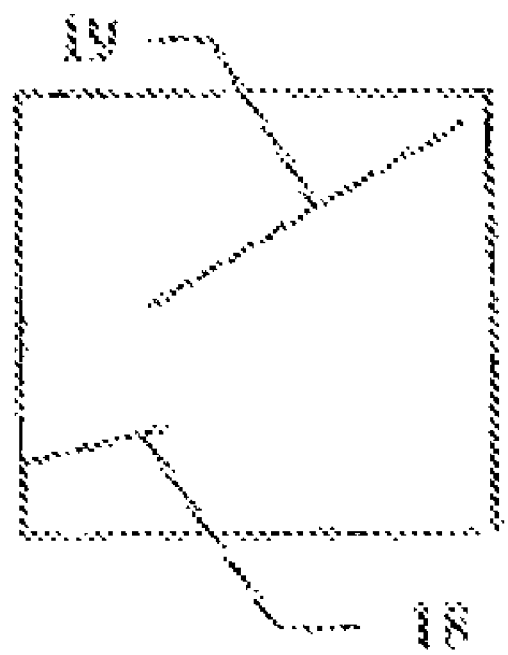

FIG. 7 shows one example of a first two-dimensional image of light lines 18, 19 and 20 of the light fan 12 according to FIG. 6 that are projected on the floor of the washing installation and a vehicle surface—that is illustrated in the form of an exemplary object of simple geometric shape—and recorded by the first camera 13, wherein FIG. 8 shows the second two-dimensional image of the same light line 18 that is recorded by the second camera 14. The viewing directions of both cameras 13 and 14 are indicated with arrows 21, 22.

The process of determining the three-dimensional surface structure of the vehicle in its entirety is described below.

The control unit 20 enables the washing portal 1 to approach the vehicle 2 to be washed from the front and subsequently begins to respectively record one two-dimensional image of the vehicle 2 illuminated by the light fans 11 and 12 and an image without illumination with the two cameras 13 and 14 within certain scanning increments, wherein said images are stored in a storage module of the control unit 20. In addition, the control unit 20 records the longitudinal position of the washing portal 1 as well as its moving speed that corresponds to the relative position or relative movement between the washing portal 1 and the vehicle 2 for each increment. This incremental recording process is continued until the washing portal 1 traverses the vehicle 1 and arrives at its end. If the invention is used in a drive-thru washing installation, it would be possible to realize the traversing process such that the vehicle 2 drives past stationarily fixed cameras and laser line projectors.

In order to prepare the light lines of the light fans 11 and 12 that are projected on the two-dimensional images of the cameras for further processing, the illuminated and the non-illuminated images of a camera 13 or 14 which were recorded during one scanning increment are digitally subtracted from one another or divided such that essentially only the position of the projected light lines remains on the two-dimensional image while the remaining projected parts of the vehicle or the vehicle washing installation are canceled out. If the filters adapted to the wavelengths of the lasers are able to sufficiently suppress the influence of interfering external light, this graphic preparation can also be omitted. It can already be carried out in each scanning increment during the forward movement of the washing portal 1 or at the end of a complete traversing movement thereof.

Once all images are prepared in this fashion, the three-dimensional data of the surface structure of the vehicle 1 is calculated by utilizing the generally known light section calculation method, for example, disclosed in DE 42 08 455, DE 103 12 696 or DE 698 11 667, namely with the assistance of triangulation based on the recorded images, position and/or movement data, as well as the position data of the cameras 13 and 14 stored in the control unit 20, the laser line projectors 9 and 10 and the known recording angles of the light fans 11 and 12 relative to the cameras 13 and 14. This three-dimensional data is subsequently combined into a three-dimensional model of the vehicle surfaces that are directed upward and sideward. Alternatively, the three-dimensional model can already be generated during the recording of the individual two-dimensional images in each scanning increment such that the three-dimensional model is generated incrementally in this case.

Subsequently, the model of the vehicle surfaces stored in the control unit 20 is used for optimally controlling the treatment devices during the entire washing and treatment process, for example, in order to optimally adjust the rotary washing brushes 6, 7 and 8 relative to the vehicle surfaces.

The invention is not limited to the embodiments shown. For example, the three-dimensional surface structure may be similarly recorded in a drive-thru washing installation, wherein the image is advantageously recorded while the vehicle drives into the vehicle washing installation in this case.

It would also be possible to utilize only one laser-camera pair instead of two laser-camera pairs, wherein the camera is arranged on the crossbeam such that it can be displaced transverse to the washing direction in order to record the first and second two-dimensional images of the three-dimensional vehicle surface.

The invention claimed is:

1. A method for controlling a vehicle washing installation by utilizing a light section process, wherein at least one treatment device and a vehicle to be washed are moved relative to one another in a washing direction, wherein vehicle surfaces are illuminated by light fans emitted from two different positions, wherein a first and a second two-dimensional image of the vehicle surfaces illuminated by the light fans are recorded from angles that extend obliquely referred to planes of the light fans and are stored in a control unit together with relative position and/or relative movement between the treatment devices and the vehicle, wherein above-described steps are repeated during traversing from one end of the vehicle to another end of the vehicle, wherein a three-dimensional depiction of the vehicle surfaces is calculated during or after the end of traversing movement from the two-dimensional images stored in the control unit, recording angles, relative position and/or relative movement and position data of the light fans, and wherein this three-dimensional depiction is used for controlling the vehicle washing installation.

2. The method according to claim 1, wherein the two-dimensional images are recorded from positions that are offset relative to one another.

3. The method according to claim 1, wherein the two-dimensional images are recorded discontinuously during relative movement between the treatment device and the vehicle.

4. The method according to claim 1, wherein a complete set of two-dimensional images is recorded during a traversing process in order to calculate the three-dimensional depiction of the vehicle.

5. The method according to claim 1, wherein a corresponding two-dimensional image is recorded without illumination by the light fans for each of the two-dimensional images of the vehicle surfaces illuminated by the light fans, wherein corresponding illuminated, and non-illuminated images are subtracted from one another and/or divided and a resulting two-dimensional image is used for calculating the three-dimensional depiction of the vehicle surfaces.

6. An apparatus for carrying out the method according to claim 1, featuring a first and a second light source and a first and a second image recording unit that are connected to a control unit, wherein at least one treatment device and a vehicle to be washed are moved relative to one another in the washing direction, wherein the light sources for producing the light fans are aligned in one plane and spaced apart from one another, wherein the image recording units are designed for recording a first and a second two-dimensional image of the vehicle surfaces illuminated by the light fans, as well as for forwarding the two-dimensional images to the control unit, and are arranged at oblique recording angles referred to the planes of the light fans, and wherein the control unit is designed for storing the two-dimensional images, the position data of the light sources and the image recording units, the relative position and/or relative movement between the treatment devices and the vehicle, in order to calculate the three-dimensional depiction of the vehicle surfaces from the stored data and to derive control signals therefrom.

7. The apparatus according to claim 6, wherein the light sources and/or the image recording units are arranged in a protective housing.

8. The apparatus according to claim 6, wherein the image recording units are arranged offset referred to the light sources in the washing direction.

9. The apparatus according to claim 6, wherein the light sources and the image recording units are arranged on a crossbeam of a displaceable washing portal of the vehicle washing installation.

10. The apparatus according to claim 9, wherein the first light source and the first image recording unit are arranged on one lateral end and the second light source and the second image recording unit are arranged on the other lateral end of the crossbeam.

11. The apparatus according to claim 6, wherein the light sources consist of laser line projectors that emit laser beams.

12. The apparatus according to claim 11, wherein the laser line projectors feature devices for widening the laser beams into static light fans.

13. The apparatus according to claim 11, wherein the laser line projectors feature lasers that can be moved in the plane of the light fans in order to produce non-static light fans.

14. The apparatus according to claim 6, wherein the image recording units consist of light-sensitive cameras that record images electronically.

15. The apparatus according to claim 14, wherein filters adapted to the wavelength of the light fans, are arranged in front of the cameras.

16. The method according to claim 1, wherein the three-dimensional depiction is used for controlling the at least one treatment device arranged on the vehicle washing installation.

* * * * *